Figure 1:
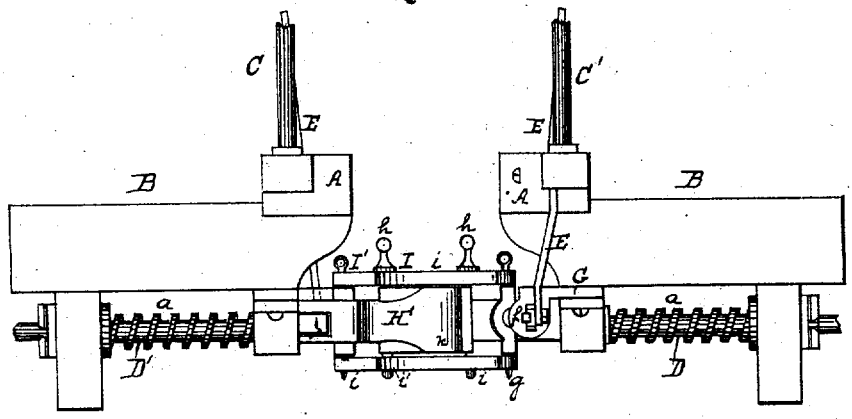

2 Sheets—Sheet 1.

C. BROWNING.

Assignor of one-half to LINDSAY & McCUTCHEON; said BROWNING and LINDSAY & McCUTCHEON assignors to J. H. LINDSAY, trustee.

CAR COUPLING.

No. 10,291. Reissued Feb. 27, 1883.

Witnesses.
J. N. Cooke
F. G. May

Inventor.
Clinton Browning
By James J. Kelly
Attorney

N. PETERS, Photo-Lithographer, Washington, D. C.

C. BROWNING. 2 Sheets—Sheet 2.
Assignor of one-half to LINDSAY & McCUTCHEON; said BROWNING and LINDSAY & McCUTCHEON assignors to J. H. LINDSAY, trustee.
CAR COUPLING.
No. 10,291. Reissued Feb. 27, 1883.
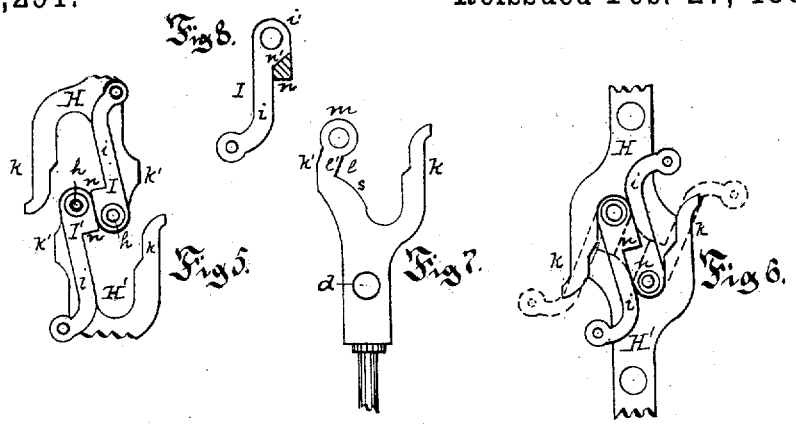
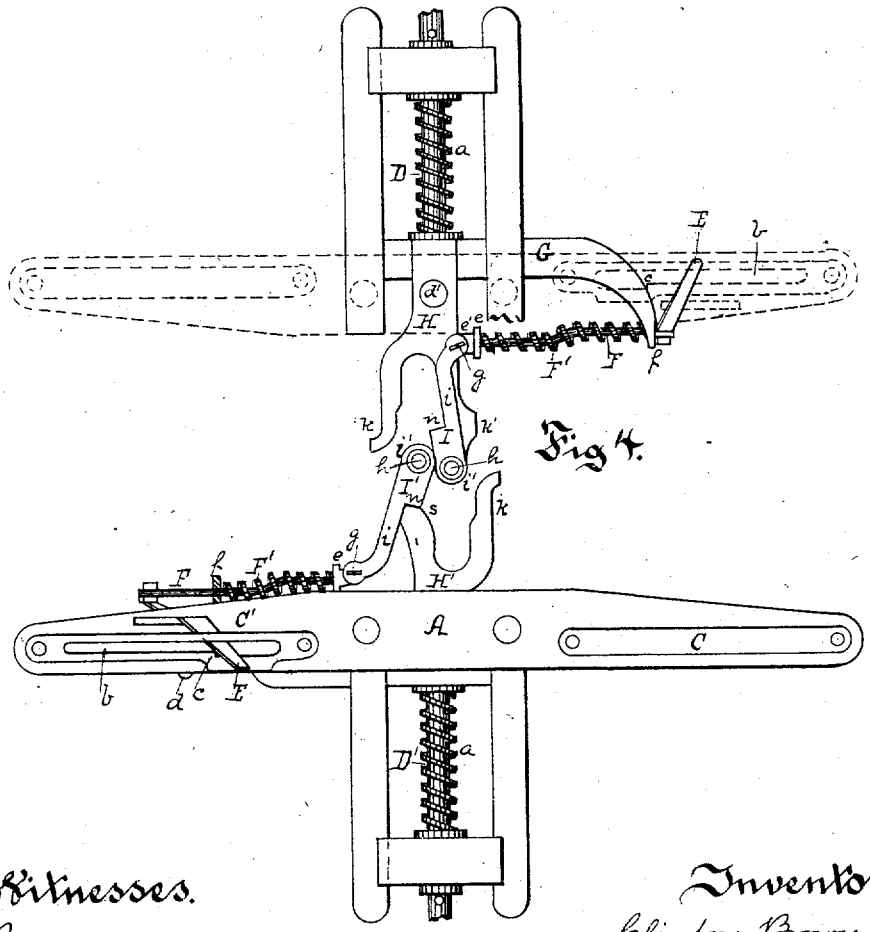
Witnesses.
J. N. Cooke
P. G. Kay
Inventor.
Clinton Browning
By James T. Kelly
Attorney
N. PETERS, Photo-Lithographer, Washington, D. C.

UNITED STATES PATENT OFFICE.

CLINTON BROWNING, OF SHOUSETOWN, ASSIGNOR OF ONE-HALF TO LINDSAY & McCUTCHEON, OF ALLEGHENY; SAID BROWNING AND LINDSAY & McCUTCHEON ASSIGNORS TO JAMES H. LINDSAY, TRUSTEE, OF ALLEGHENY CITY, PA.

CAR-COUPLING.

SPECIFICATION forming part of Reissued Letters Patent No. 10,291, dated February 27, 1883.

Original No. 254,107, dated February 28, 1882. Application for reissue filed January 19, 1883.

*To all whom it may concern:*

Be it known that I, CLINTON BROWNING, of Shousetown, formerly of Allegheny city, in the county of Allegheny and State of Pennsylvania, have invented certain new and useful Improvements in Car-Couplings; and I do hereby declare that the following is a full, clear, and exact description thereof.

My invention relates to a self-coupling for railroad-cars; and the nature of the same consists, first, in a pair of bifurcated or double-jawed draw-heads, in combination with a shouldered laterally-swinging and interlocking lever pivoted in one jaw of each draw-head in front of the shoulder of the lever, and having an operating arm or arms extending back from said shoulder, and apparatus for withdrawing said lever secured to said arm, the coupling being so constructed that one of the jaws of the respective heads enters between the jaws of the opposite draw-head, and the other jaw extends along and clasps the outer side of the jaw which does enter, and thereby prevents lateral separation of the heads, and the interlocking shoulders being so constructed that they stand diagonal to the central line of draft, and the interlocking levers are at right angles, or nearly so, to the said diagonal line of the levers, and thus the strain upon the levers is thrown in line with the pivots of the levers and taken off the springs, which are only used to throw the jaws into their locking position and keep the draw-heads coupled; second, in continuing the shoulders of the interlocking levers from the top to the bottom of the draw-heads and recessing the inner side of the pivoting-jaws of the bifurcated draw-heads for the reception of the continuation of the shoulders of the levers while the levers are moved aside in the act of automatically coupling the cars; third, in the combination of hand-levers, locking-shoulders, springs, connecting-rods, shouldered interlocking levers, and bifurcated draw-heads, whereby the draw-heads can be uncoupled from the platform, and the interlocking levers can be moved in position for automatically recoupling the draw-heads; fourth, in uniting the respective draw-heads to their spring draw-bars by means of vertical pivots, whereby the draw-heads will move longitudinally with the draw-bars, and at the same time have freedom to swing horizontally in turning curves; fifth, in rounding off the edges or corners of the hinging eyes of the shouldered levers and the pivoting-jaws of the draw-heads, for the purpose of preventing the joints from being cramped by metal upset or displaced by the jamming of the jaws against one another in coupling; sixth, in draw-heads provided with pivoted interlocking levers, which operate in a peculiar manner with respect to the line of draft of the cars; and, finally, in details of construction hereinafter set forth.

Figure 3:
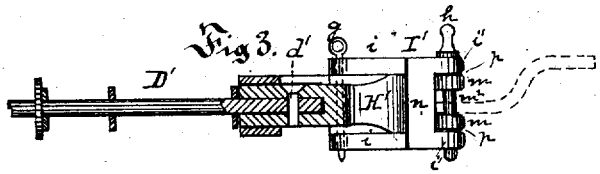
Figure 2:
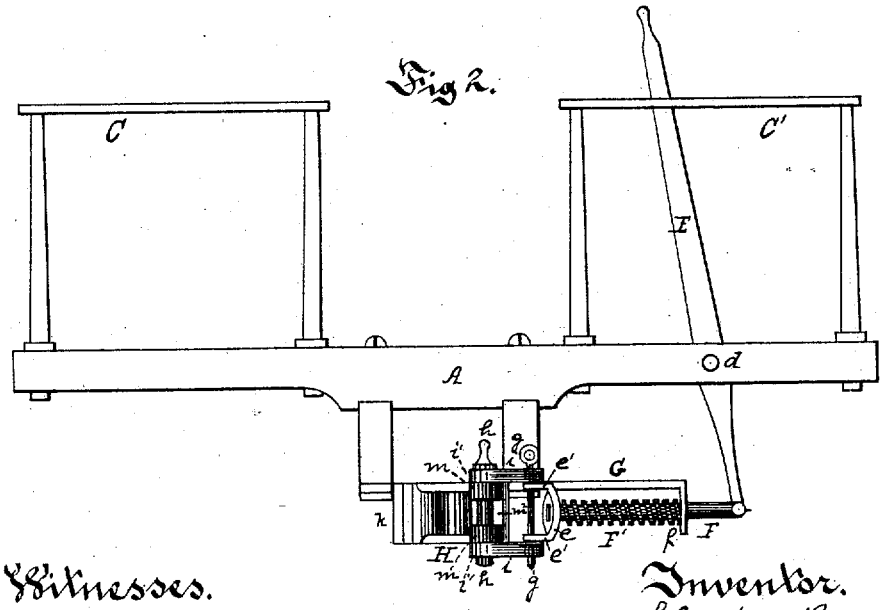

In the accompanying drawings, which are intended to illustrate my invention, Figure 1 is a side elevation, showing my invention as applied upon supports answering, by way of illustration, to such as are usually applied upon railroad-cars. In this view two draw-heads are shown as coupled. Fig. 2 is a front elevation of one of the draw-heads, its adjuncts and supports answering, by way of illustration, to such as are provided on a car. Fig. 3 is a vertical section and partial elevation of one of the draw-heads, spring draw-bars, interlocking levers, and supports of the draw-head and bar. Fig. 4 is a plan view of Fig. 1, the end beam, locking-bar, and rail of one of the cars being removed, and the same represented as in their positions by dotted lines. Fig. 5 is a detail view, showing the interlocking levers in their coupling position, but uncoupled. Fig. 6 shows the same as Fig. 5, except that the jaws are coupled. Fig. 7 is a detailed plan view of the draw-head, and Fig. 8 is a detail horizontal section of the interlocking lever.

A is the front cross-beam of the platform of a car-frame; C B C′, the end rails of the platform; D D′, the sliding draw-bars, provided, as usual, with springs *a*, which serve to relieve the draw-heads H H′ when bumping against each other. In the end rail, C′, of each of the car-platforms a long slot, *b*, is provided, having a locking-shoulder, *c*, and down through this slot a hand-lever, E, is passed, and after being pivoted at *d* to the front beam, A, is connected by its lower end to a laterally-moving rod, F, which is guided by a bracket, G, of the car-frame. This rod F has a head, *e*, with two jaws, *e′ e′*, attached to its inner end, and between this head and the vertical portion *f* of the bracket G a spiral spring, F′, is placed around the rod. The jaws of the rod loosely clasp the draw-head H, and they are perforated to receive a pivot, *g*, which connects the rod with the operating-arm *i* of the interlocking lever I of the draw-head, said lever being connected by the pivoting leaves or arms *i′* and pivot *h* to the front end of the pivoting-jaw *k′* of the draw-head. Both draw-heads H H′, levers I I′, and their adjuncts are constructed precisely alike; but the pivoting-jaw *k′* of the draw-head H, carrying the interlocking lever I, stands on the right side of the center line of draft on one car and on the left side of said line on the other car, and the slotted locking-bar of the rail, the lever, and the rod and spring for operating the interlocking lever I of one car stand on the right-hand side of said line, while the interlocking lever I′ and parts for operating it of the other car stand on the left-hand side of said line.

The draw-heads H H′ are loosely jointed to the spring draw-bars D D′ by means of suitable fitting and vertical pivots *d′*, and they can swing on said pivots while the cars are turning curves. At the front ends the draw-bars are bifurcated or formed with two jaws, *k k′*. These jaws extend forward from a solid body portion of the draw-head, and at their rear end they are united on their inner sides by a semicircle, or nearly a semicircle, and from this circle they inclose a gradually-widened oblong space, which on one side is bounded by a curved extension of the clasping-jaw *k* in form of a cyma reversa, and on the opposite side by a very obtuse angled extension of the pivoting-jaw *k′*, as shown in Fig. 7 of the drawings. The exterior surfaces of the respective jaws partake very closely of the form of the interior surfaces thereof. In the jaw *k′* a depression or recess, *l*, having a beveled surface, *l′*, is formed, as shown, for a purpose presently described. At the extreme front end of the jaw *k′* nearly-circular hinging ears or lugs *m* are formed, a space, $m^2$, being between the same, and one lug being at the top and the other at the bottom of the jaw.

The interlocking lever I is shown bifurcated at its front and rear ends, thus forming the pivoting arms or leaves *i′* and the operating-arms *i*, and it is formed with a right-angled shoulder, *n*, between its bifurcated ends, as shown. This lever fits under and on top of the draw-head H, and its front ends or arms, *i′*, are perforated to coincide with the holes in the front hinging ends of the draw-head, and through these perforated ends of the hinging ears *m* of the draw-head the hinge pivot or pin *h* is passed for the purpose of hinging the lever to the draw-head. The shouldered portion *n* of the lever is curved or beveled at *n′* on its rear side, and is otherwise so shaped that it enters the recess *l*, and its front surface stands flush with the inner surface of the jaw *k′* when the lever I′ is moved sidewise, as illustrated in the drawings, Fig. 4; but it extends out between the jaws some distance from the inner face of the jaw *k′* when either the lever I or I′ is allowed to assume a coupling position as shown in Figs. 5 and 6. By having the levers I I′ bifurcated and formed with a long shoulder, *n*, extending from top to bottom of the draw-head great strength for sustaining the pulling strain of the cars is secured.

In the space between the two jaws the jaw *k′* is recessed or cut away opposite the shoulder *n* of the incoming lever I, as at *s*, so as to give free space for the reception of the lever, and to allow the shouldered lever to enter the draw-head and couple when the draw-heads are at different heights, and to allow the vertical motion of the draw-heads without causing the uncoupling of the levers. This is shown in Figs. 4 to 7 of the drawings, the levers entering the recessed part *s* when locked, as in Fig. 6, and a diamoned-shaped space being formed by these recessed parts and the faces of the levers I I′ when they are drawn back as shown in dotted lines in Fig. 6.

In order to prevent cramping of the joint formed between the draw-heads and the interlocking levers by the upsetting of the metal when the draw-heads jam together, the corners *p* of the hinging ears or lugs are rounded off, as shown in the drawings. The pivots of the shouldered interlocking levers are set on opposite sides of the central line of draft, and by this arrangement the right-angular interlocking shoulders are caused, by the action of their springs, to stand diagonal to this line when the draw-heads are coupled, and the pull or strain comes diagonal to said line of draft, and is thrown directly and wholly upon the pivots of the levers, and by this action of the levers the springs are relieved of the pulling strain of the cars, and they are therefore not depended upon for holding the draw-heads in their coupled position. The springs, however, act to prevent a separation of the draw-heads when there is a slack motion or a back action of the draw-heads.

To couple cars with my improved coupling, the levers E are set free from the locking-shoulders *c* of the rail C′, and the springs F′ allowed to move the shouldered interlocking levers to the position shown in Fig. 5. Now, by bumping the draw-heads together the hinged lever of one draw-head will strike the hinge-lever of the other, and a mutual lateral displacement of the levers will take place until the shouldered portions of the levers coincide, when the shouldered part of one will be caused to interlock with the shouldered part of the other by the spiral springs F′.

To uncouple the draw-heads, move either the interlocking lever I or I′ to a position corresponding to the position of the lever I in Fig. 4, and then separate the draw-heads by running either one of the two cars backward or forward.

By having hinging ends of the draw-heads formed with spaces $m^2$ between their hanging lugs or ears $m$ an ordinary link may be used between the draw-heads for coupling the cars, as occasion may require. When a link is used the pivots or pins $h$ are raised sufficiently to admit the link between the lugs or ears $m$ into the spaces $m^2$, and then lowered through the link and ears, upon which it rests. Thus the pivots or pins $h$ subserve two purposes—the one of fastening the levers and the other of holding a link-coupling.

Previous to my invention bifurcated draw-heads constructed so as to have one of the jaws on one head enter between two of the jaws on another head were well known; also, such draw-heads had been provided with coupling-tumblers, which were arranged to turn on pivots for the purpose of insuring a frictional bind of one tumbler upon another while the cars are pulling against one another, as shown in Reissued Letters Patent No. 9,727, and I do not claim anything shown in said Letters Patent; but my invention obviates the necessity of depending alone upon the frictional contact of the coupling devices to insure the retention of the cars in a coupled condition, it providing positive interlocking or hooking shoulders in rear of the pivots of the coupling devices as a means for positively coupling the cars; also, lever extensions on the coupling devices, whereby the cars can be readily uncoupled. It also affords very strong and long interlocking shoulders, and admits of an ordinary link being used in cases of necessity.

What I claim as my invention, and desire to secure by Letters Patent, is—

1. In combination with the bifurcated or double-jawed draw-heads H H′, the levers I I′, each pivoted at the front of one of the jaws thereof, and provided with the flat hooking or interlocking shoulder $n$ back of said pivotal point, and the operating-arm extending back from said shoulder, and connected to apparatus for withdrawing said lever, substantially as and for the purposes set forth.

2. In a twin coupling, the combination, with the bifurcated draw-head having the jaws $k$ $k'$, the lever I, pivoted to said jaw $k'$ by means of the two front arms or leaves, $i'$, and the pivot-pin $h$, extending through said arms and jaw, and provided with the flat hooking or interlocking shoulder $n$, and operating-arms $i'$, extending above and below said jaw, substantially as and for the purposes set forth.

3. In twin couplings, the bifurcated draw-head provided with the clasping-jaw $k$, and the pivoting-jaw $k'$, having the recess $l$, in combination with the lever I, pivoted to said jaw $k'$, and provided with the flat locking-shoulder $n$, extending from the top to the bottom of the draw-head and fitting within said recess $l$, substantially as and for the purposes set forth.

4. In twin couplings, the combination, with the bifurcated draw-heads H H′, having the clasping-jaws $k$ and pivoting-jaws $k'$, of the locking-hooks pivoted at the ends of said jaws $k'$, where said pivoting-jaws $k'$ are recessed or cut away, as at $s$, for the reception of the face of the hook in the opposite draw-head, substantially as and for the purposes set forth.

5. In combination with the bifurcated draw-head H and the lever I, pivoted at the front of one jaw and having the flat or lateral interlocking shoulder $n$ back of said pivotal point, and the operating arm or arms $i$, the rod F, spring F′, hand-lever E, and locking-shoulder $c$, substantially as and for the purposes set forth.

6. The bifurcated draw-head H, having the jaw $k'$, provided with a space, $m^2$, between its hinging-ears for the reception of a coupling-link, in combination with the locking-lever I, pivoted in said jaw and vertically-sliding and removable pivot-pin, $h$, substantially as set forth.

7. The bifurcated draw-head H, having the pivoting-jaw $k'$, provided with hinging-ears $m$, in combination with the locking-lever I, having hinging-ears $i'$, and the pivot-pin $h$, where said hinging-ears are rounded at their corners, as at $p$, substantially as and for the purposes set forth.

8. In twin couplings, the bifurcated draw-heads H H′, provided with interlocking levers pivoted in said draw-heads, and having flat or lateral interlocking shoulders $n$, back of said pivotal points, arranged and constructed to pull squarely against the respective flat shoulders $n$ of one another on a line diagonal to a central line of draft of the cars, and thereby relieve the springs of the levers I I′ from strain, while at the same time the draw-heads maintain their coupled position, substantially as described.

In testimony that I claim the foregoing I have hereunto set my hand this 16th day of January, 1883.

CLINTON BROWNING.

Witnesses:
JAMES I. KAY,
J. N. COOKE.